(12) United States Patent
Wang et al.

(10) Patent No.: US 12,591,886 B1
(45) Date of Patent: Mar. 31, 2026

(54) PROCESSING SYSTEM OF A NETWORK USING INTENT OBJECT TO INSTRUCT SERVERS REGARDING ELECTRONIC DEVICE

(71) Applicant: Stripe, Inc., South San Francisco, CA (US)

(72) Inventors: Dan Wang, South San Francisco, CA (US); Olivier Godement, South San Francisco, CA (US); Sara Meretab, South San Francisco, CA (US); Sophia Sakellariadis, South San Francisco, CA (US); Huan Chen Lu, South San Francisco, CA (US)

(73) Assignee: Stripe, LLC, South San Francisco, CA (US)

( * ) Notice: Subject to any disclaimer, the term of this patent is extended or adjusted under 35 U.S.C. 154(b) by 0 days.

(21) Appl. No.: 19/082,124

(22) Filed: Mar. 17, 2025

Related U.S. Application Data

(63) Continuation of application No. 18/203,467, filed on May 30, 2023, now abandoned, which is a continuation of application No. 16/917,642, filed on Jun. 30, 2020, now abandoned.

(51) Int. Cl.
| | |
|---|---|
| *G06Q 20/38* | (2012.01) |
| *G06Q 20/10* | (2012.01) |
| *G06Q 20/12* | (2012.01) |

(52) U.S. Cl.
CPC .......... *G06Q 20/385* (2013.01); *G06Q 20/10* (2013.01); *G06Q 20/12* (2013.01)

(58) Field of Classification Search
None
See application file for complete search history.

(56) References Cited

U.S. PATENT DOCUMENTS

| | | | | |
|---|---|---|---|---|
| 8,762,272 B1 * | 6/2014 | Cozens | ............... | G06Q 10/107 |
| | | | | 705/40 |
| 2004/0002918 A1 * | 1/2004 | McCarthy | .............. | G06Q 20/04 |
| | | | | 705/40 |
| 2015/0012420 A1 * | 1/2015 | Kim | ....................... | G06Q 20/14 |
| | | | | 705/40 |
| 2017/0132614 A1 * | 5/2017 | Acharya | ................ | G06Q 20/38 |

FOREIGN PATENT DOCUMENTS

| | | | | |
|---|---|---|---|---|
| CA | 3046235 A1 * | 12/2019 | ............. | H04L 45/08 |

* cited by examiner

*Primary Examiner* — Jamie R Kucab
(74) *Attorney, Agent, or Firm* — Foley & Lardner LLP

(57) ABSTRACT

A method comprising: creating, on a server, an object corresponding to the transaction; tracking state of the object as the object transitions between a plurality of states, the object being in one state while waiting for a transfer for the transaction; and automatically associating with the object by matching a reference code received with the transfer.

20 Claims, 7 Drawing Sheets

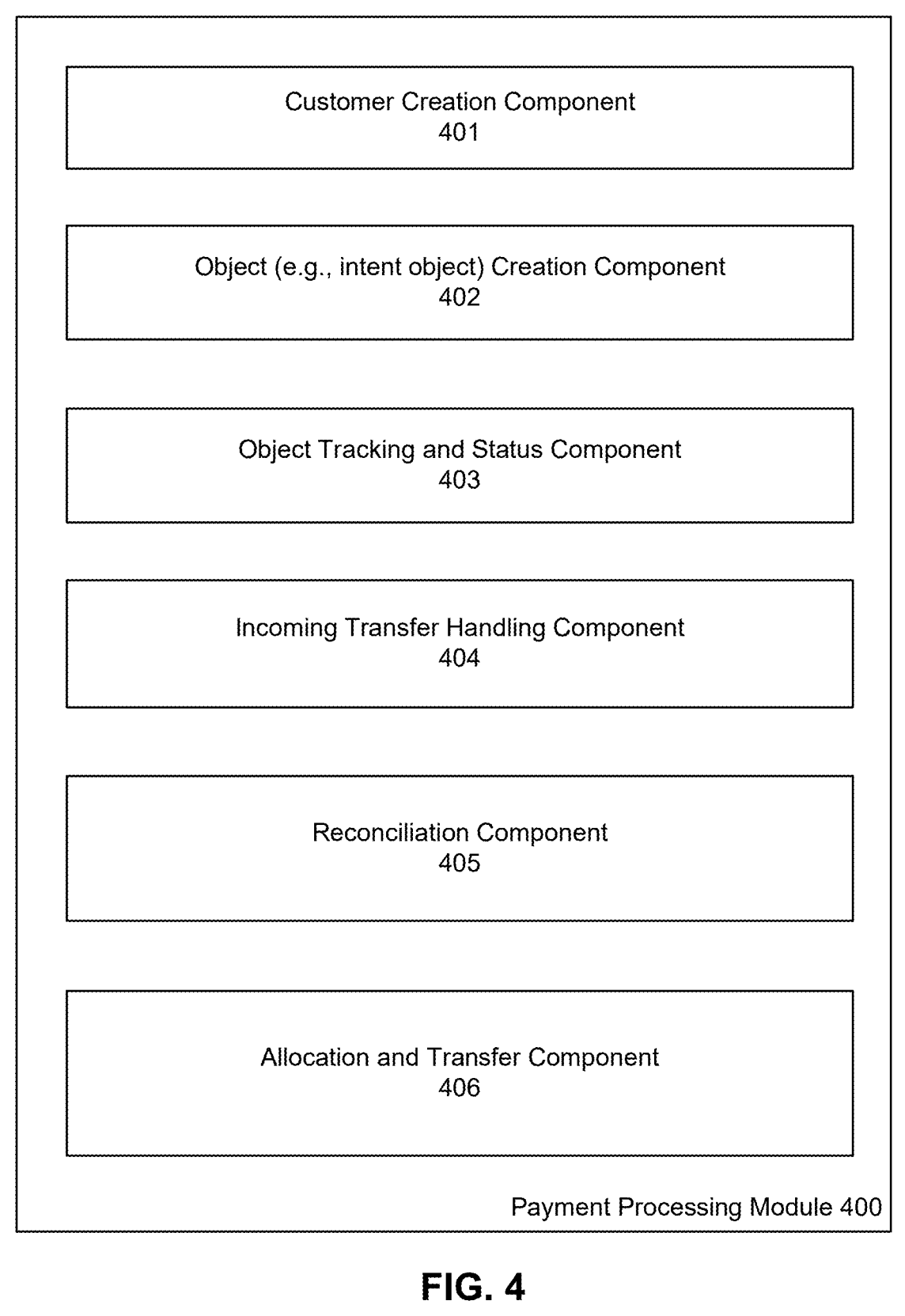

Customer Creation Component
401

Object (e.g., intent object) Creation Component
402

Object Tracking and Status Component
403

Incoming Transfer Handling Component
404

Reconciliation Component
405

Allocation and Transfer Component
406

Payment Processing Module 400

FIG. 4

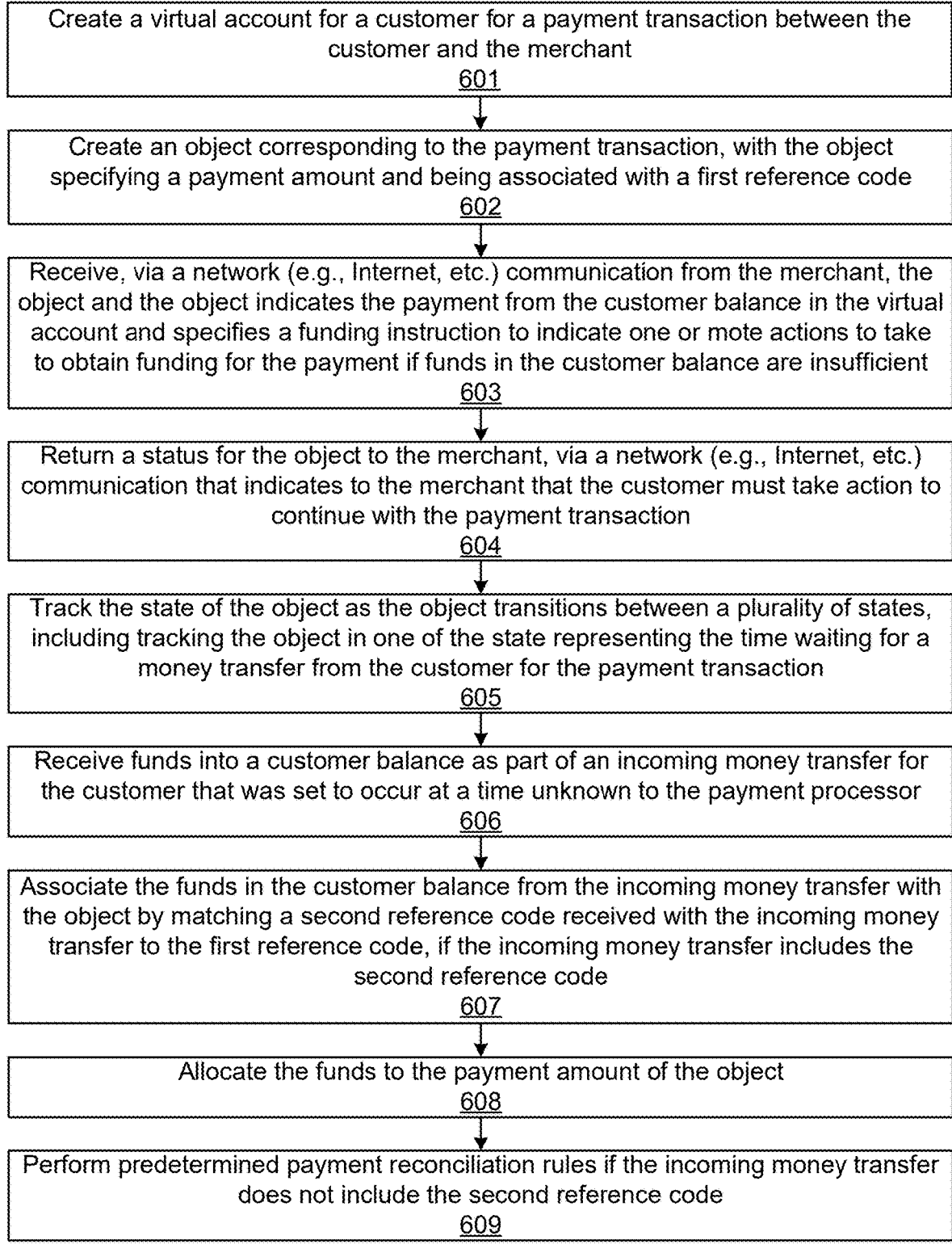

Create a virtual account for a customer for a payment transaction between the customer and the merchant
601

Create an object corresponding to the payment transaction, with the object specifying a payment amount and being associated with a first reference code
602

Receive, via a network (e.g., Internet, etc.) communication from the merchant, the object and the object indicates the payment from the customer balance in the virtual account and specifies a funding instruction to indicate one or mote actions to take to obtain funding for the payment if funds in the customer balance are insufficient
603

Return a status for the object to the merchant, via a network (e.g., Internet, etc.) communication that indicates to the merchant that the customer must take action to continue with the payment transaction
604

Track the state of the object as the object transitions between a plurality of states, including tracking the object in one of the state representing the time waiting for a money transfer from the customer for the payment transaction
605

Receive funds into a customer balance as part of an incoming money transfer for the customer that was set to occur at a time unknown to the payment processor
606

Associate the funds in the customer balance from the incoming money transfer with the object by matching a second reference code received with the incoming money transfer to the first reference code, if the incoming money transfer includes the second reference code
607

Allocate the funds to the payment amount of the object
608

Perform predetermined payment reconciliation rules if the incoming money transfer does not include the second reference code
609

FIG. 5

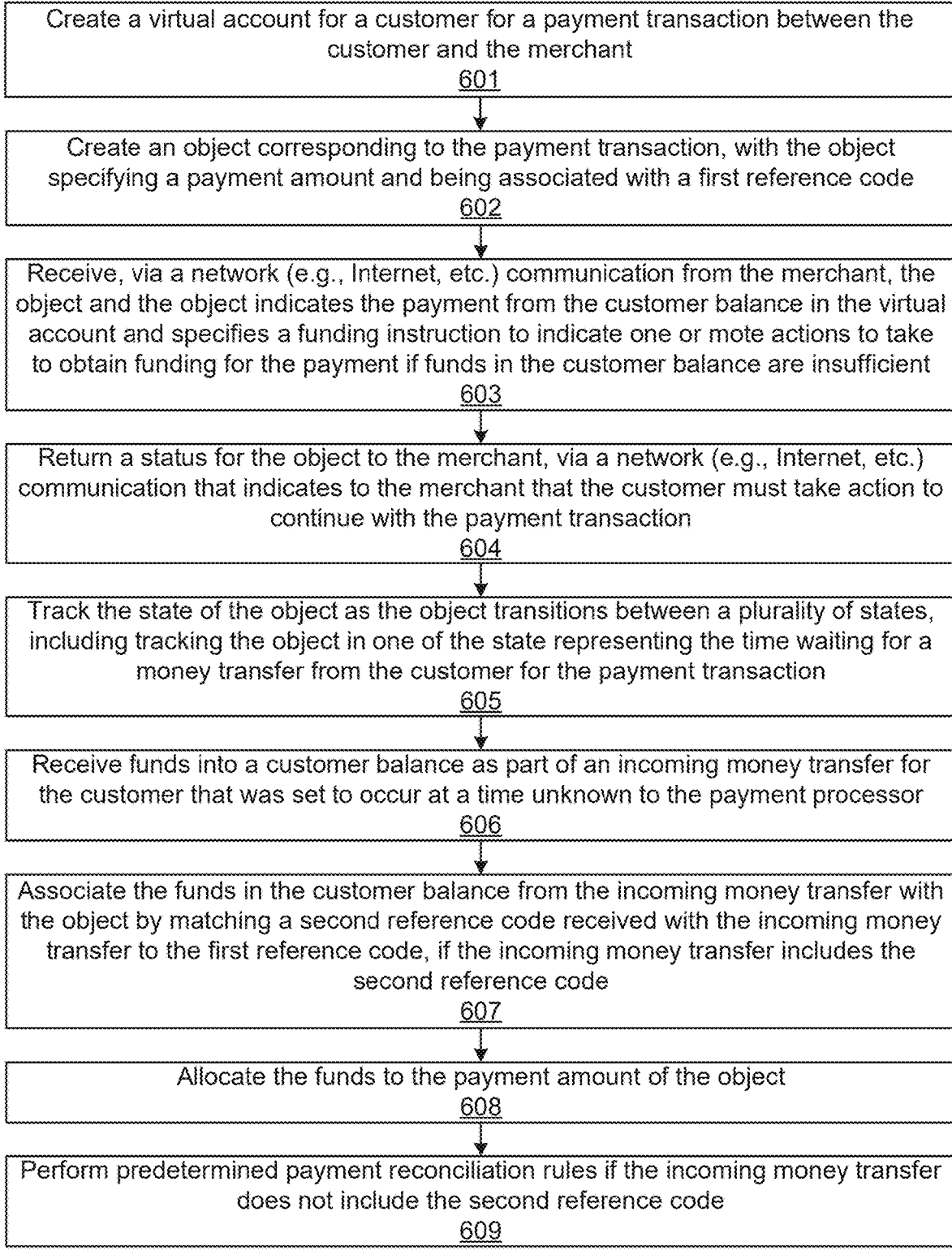

Create a virtual account for a customer for a payment transaction between the
customer and the merchant
601

Create an object corresponding to the payment transaction, with the object
specifying a payment amount and being associated with a first reference code
602

Receive, via a network (e.g., Internet, etc.) communication from the merchant, the
object and the object indicates the payment from the customer balance in the virtual
account and specifies a funding instruction to indicate one or more actions to take
to obtain funding for the payment if funds in the customer balance are insufficient
603

Return a status for the object to the merchant, via a network (e.g., Internet, etc.)
communication that indicates to the merchant that the customer must take action to
continue with the payment transaction
604

Track the state of the object as the object transitions between a plurality of states,
including tracking the object in one of the state representing the time waiting for a
money transfer from the customer for the payment transaction
605

Receive funds into a customer balance as part of an incoming money transfer for
the customer that was set to occur at a time unknown to the payment processor
606

Associate the funds in the customer balance from the incoming money transfer with
the object by matching a second reference code received with the incoming money
transfer to the first reference code, if the incoming money transfer includes the
second reference code
607

Allocate the funds to the payment amount of the object
608

Perform predetermined payment reconciliation rules if the incoming money transfer
does not include the second reference code
609

FIG. 6

PROCESSING SYSTEM OF A NETWORK USING INTENT OBJECT TO INSTRUCT SERVERS REGARDING ELECTRONIC DEVICE

SUMMARY

A method and apparatus for push-based transfers are described. In one embodiment, a method for handling a transaction involving programmatically creating a virtual account for a transaction; creating, on a server, an object corresponding to the transaction, the object being associated with a first reference code; tracking state of the object as the object transitions between a plurality of states, the object being in one state while waiting for a transfer; and automatically matching a second reference code received with the incoming transfer to the first reference code.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 is a block diagram of a computing system architecture for a processing system.

FIG. 5 is a flow diagram of one embodiment of a process for performing a transaction.

FIG. 6 is a flow diagram of another embodiment of a process for performing a transaction.

DETAILED DESCRIPTION

Figure 1:
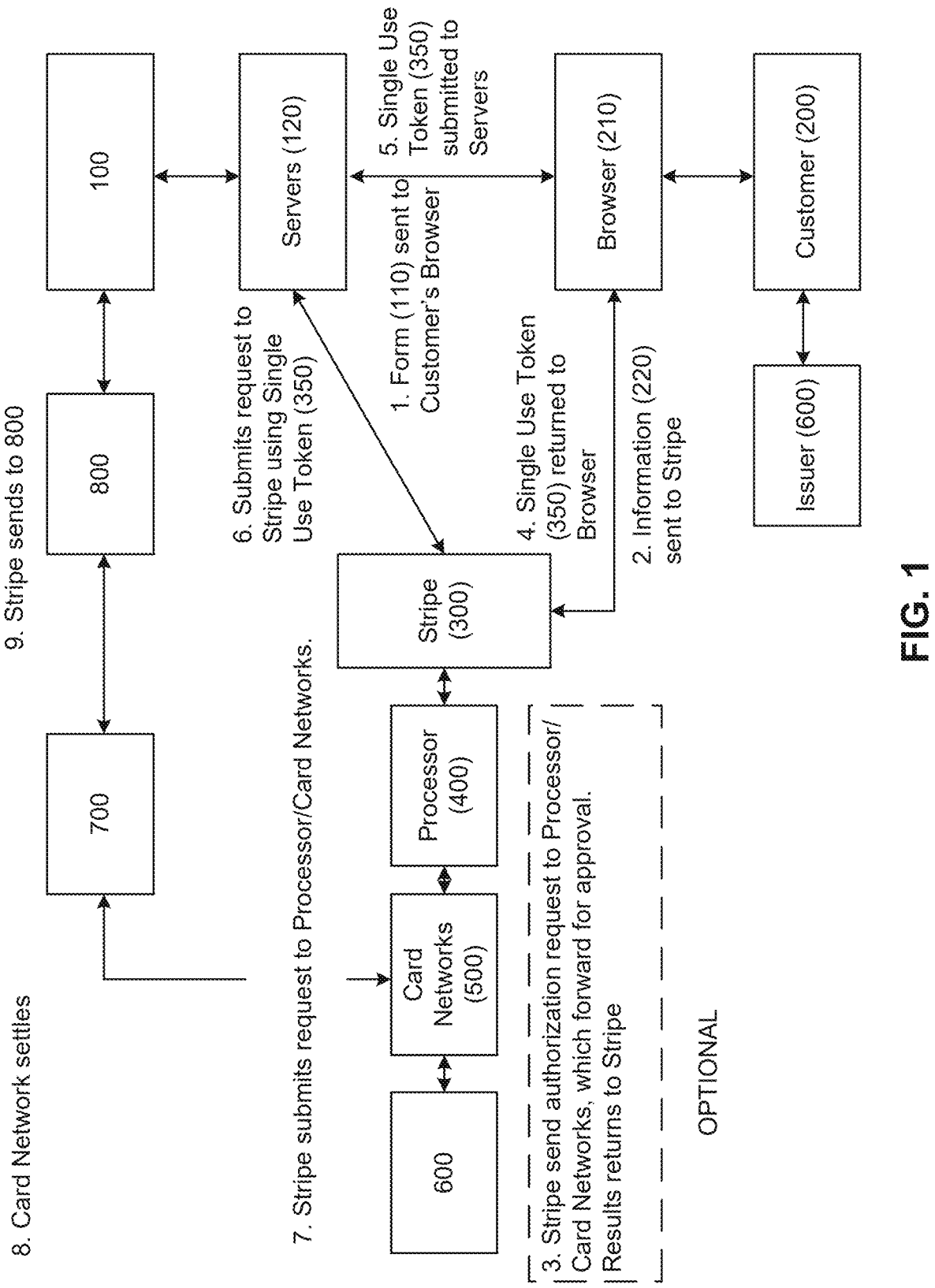
FIG. 1 shows a flow diagram of the steps and entities for implementing payment processing.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Certain terminology is used herein for convenience only and is not to be taken as a limitation on the present invention.

The following definitions are provided to promote understanding of the present invention.

Site—The site is the site (e.g., website) of the merchant. The merchant (100) and merchant server (120) in the figures are associated with the site. The site is associated with a client-side (client side) application and a server-side (server side) application. In one embodiment, the site includes Merchant Server (120), and the server-side application executes on the Merchant Server (120).

Electronic Device—Examples of this device include a desktop computer, a laptop computer, a mobile device (e.g., smartphone, tablet) and game console. The c electronic device may interact via a browser application that executes on the device, or via a native application (app) installed onto the device. The client-side application executes on the electronic device.

A processing system, as referred to herein, is an entity or a plurality of entities that facilitate a transaction between a site and an electronic device. The processing system includes selected functionality of both Stripe (300) and Processor (400)/Card Networks (500). For example, in one embodiment, Stripe (300) creates tokens and maintains and verifies publishable (non-secret) keys and secret keys in a manner well-known in the art. See for example, U.S. Pat. Nos. 10,134,036, 9,830,596, and 9,824,354. The Processor (400)/Card Networks (500) is involved in authorizing or validating payment information. In one embodiment, Stripe (300) and the Processor (400)/Card Networks (500) function together to authorize and validate payment information, issue a token, and settle any charges that are made. Accordingly, in one embodiment, the processing system refers to the functionality of Stripe (300) and the functionality of the Processor (400)/Card Networks (500). In another preferred embodiment wherein step 3A in the high-level description is not performed, and Stripe (300) performs its own verification before issuing a token, the Processor (400)/Card Networks (500) are still used for settling any charges that are made, as described in step 7A in the high-level description. Accordingly, in this embodiment, the processing system, or "payment processor," may refer only to the functionality of Stripe (300) with respect to issuing tokens.

Native Application—A Native Application or "native app" is an application commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a locally installed application. A native application differs from an interpreted application, such as a Java applet, which requires interpreter software. A native application also differs from an emulated application that is written for a different platform and converted in real-time to run, and also differs from a Web application that is run within the browser.

Overview

Techniques are disclosed herein for handling transactions involving flows with push-based transfers. These credit transfers are performed in a processing environment in which transactions are set up and are settled via a processing system. In one embodiment, the money is pushed using credit transfers made under control of the customers. In such cases, the timing of when such transfers occur to transfer funds into the processing system is not known at the time of the transfer by the processing system.

FIG. 1 shows a flow diagram of the steps and entities for implementing processing flow embodiments of the present invention.

At a high level, the processing framework described herein works as follows (FIG. 1):

1. A Merchant's Customer (200) uses an internet-enabled browser (210) to visit the Merchant's site. In one embodiment, Customer (200) is served a Stripe.js enabled Payment Form (110) using standard web technologies. Stripe.js is well-known in the art. For more information on Stripe.js, see U.S. Pat. Nos. 10,134,036, 9,830,596, and 9,824,354. The Customer (200) enters the necessary information including their Payment Information (220) and submits the Payment Form (110). The Billing Info portion of the Payment Form (110) is for payment via a credit card or debit card. If payment is to be made via an Automated Clearinghouse (ACH) transaction, the Billing Info portion of the Payment Form (110) will request a bank routing number and an account number within that bank, and possibly additional information, such as the bank name and whether the account is a checking or savings account.

2. The Customer's payment information (220) is sent from the Customer's browser (210) to Stripe (300), never touching the Merchant's Servers (120). In this manner, the client-side application electronically sends payment information retrieved from the customer's electronic device to the payment processor. The client-side application does not send the payment information (220) to the server-side application.

3. In one embodiment, Stripe (300) submits the relevant transaction to a Processor (400) or directly to the Card Network (500) for authorization or validation of the payment information. The Card Network (500) sends the request to the Card Issuing Bank (600), which authorizes the transaction. In this embodiment, Stripe (300) and Processor (400)/Card Network (500) function together as a payment processor. In another embodiment, this step is performed without any communication to the Processor (400)/Card Network (500). Instead, Stripe (300) performs its own authorization or validation of the payment information using heuristic means, such as by checking the Bank Identification Number (BIN), also referred to as the Issuer Identification Number (IIN), against a database of known valid BINs that is on file with Stripe (300). (The BIN is a part of the bank card number, namely the first six digits.) In yet another embodiment, this step is not performed at all since the authorization or validation is not necessary for the next step 4 to succeed. That is, it is acceptable to create a Single-use Token in step 4A that represents payment information which has not been validated in any way.

4. If authorized, Stripe (300) will generate and return a secure, Single-use Token (350) to the Customer's Browser (210) that represents the customer's payment information (220) but doesn't leak any sensitive information. In the embodiment wherein step A3 is not performed, Stripe (300) performs this step without waiting to receive authorization from the Processor (400) or the Card Network (500). In this manner, the payment processor (here, Stripe (300)) creates the Token (350) from the payment information sent by the client-side application, wherein the Token (350) functions as a proxy for the payment information (220).

5. The Payment Form (110) is submitted to Merchant's Servers (120), including the Single-use Token (350). More specifically, the payment processor sends the Token (350) to the client-side application, which, in turn, sends the Token (350) to the server-side application for use by the server-side application in conducting the transaction.

6. The Merchant (100) uses the Single-use Token (350) to submit a charge request to Stripe (or to create a Customer object for later use). In this step, Stripe (300) submits a request to authorize the charge to the Processor (400) or directly to the Card Network (500). This authorization specifies the actual amount to charge the credit card. If an authorization was already done in step 3A for the correct amount, this authorization request can be skipped. This may be a one-time payment for a merchant item, or it may involve registering the payment information with the merchant site for subsequent use in making a payment for a merchant item (so-called "card on file" scenario). Using the process described in steps 1-6, the payment information can be used by the server-side application via the Token (350) without the server-side application being exposed to the payment information.

7. Stripe (300) settles the charge on behalf of the Merchant (100) with the Processor (400) or directly with the Card Network (500).

8. The Card Network (500) causes the funds to be paid by the Card Issuing Bank (600) to Stripe (300) or to Stripe's Acquiring Bank (700).

9. Stripe (300) causes the settled funds to be sent to the Service Provider (100) (or to the Merchant's Bank (800)), net of any applicable fees.

10A. The Card Issuing Bank (600) collects the paid funds from the Customer (200).

Embodiments of the present invention may be operational with numerous general-purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, programmable consumer electronics, network PCs, minicomputers, mainframe computers, distributed computing environments that include any of the above-mentioned systems or devices, and the like.

Embodiments of the present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in association with local and/or remote computer storage media including, by way of example only, memory storage devices.

Overview of Credit Transfers

In one embodiment, the platform described above settles some payment transaction using credit transfers that involve a bank transfer payment. In one embodiment, the bank transfer payments are accomplished by providing customers with a virtual bank account number by which they can push money to the payment processing system from their own online bank interface, in-person bank branch, or other financial institution. Bank transfers provide a safe way for customers to send money over bank rails.

In one embodiment, unlike most payment methods, however, bank transfers do not allow the payment processing system to control the amount a customer pushes to the payment processing system nor the timing of when the transfer take place. Unfortunately, this may result in customers sending an incorrect amount of funds (e.g., too much money, too little money) to the payment processing system to settle a payment transaction. In one embodiment, because the payment processing system cannot control the frequency, timing, or amount of transfers made by a customer and to help manage common over-payment and under-payment issues, the payment processing system holds a customer's bank transfers in a single customer balance from which a merchant can then receive payment. This makes it easier to track how much customers owe, regardless of how much or how often they send funds, which allows the merchant to flexibly receive payments from the balance at any time and worry less about the mechanics of how and when the transfers were made.

In one embodiment, if the customer already has a balance that is high enough to cover a payment amount for a payment transaction, the amount can be satisfied out of the customer balance, and if not, the customer can receive instructions to perform a bank transfer to cover any remaining amount of the payment amount that needs to be paid.

In one embodiment, the bank transfers are sent to a virtual account number. In one embodiment, the virtual account number is created by the payment processing system and sent to a customer for use when creating and/or setting up the bank transfer to occur. In one embodiment, the virtual account number is sent to the merchant and forwarded by the merchant to the customer with instructions regarding the bank transfer, along with other information related to the payment transaction.

In one embodiment, because incoming money transfers are all received into a single customer balance of a customer, a reference code associated with an individual payment transaction is used to reconcile the payment amount of the payment transaction with an incoming bank transfer. In one embodiment, the reference code is an alphanumeric string that the customer receives as part of their funding instructions. In one embodiment, the reference code is a unique, random value that is created automatically. In another embodiment, the reference code is created by either the merchant or the payment processing system.

Figure 2:
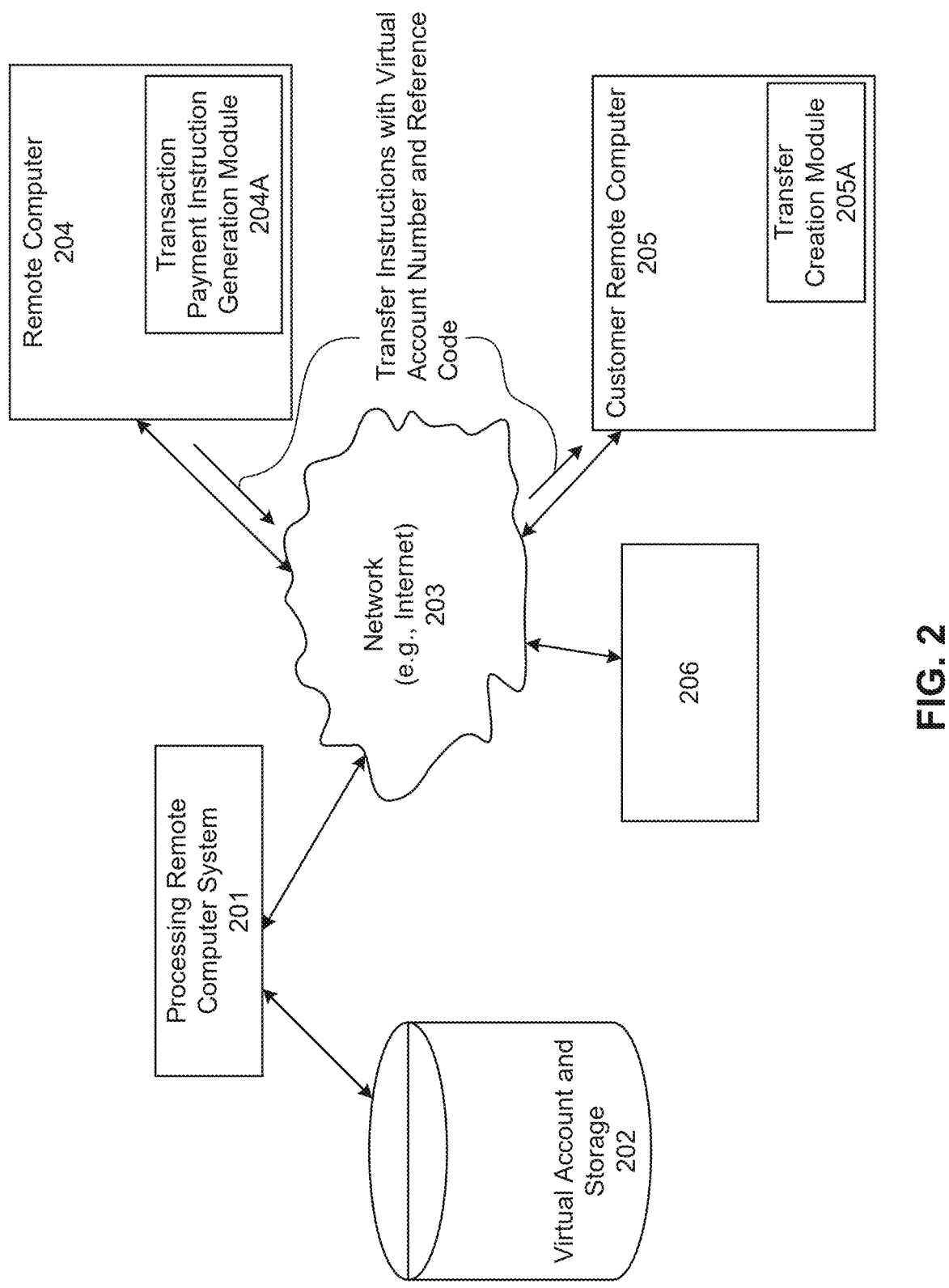
FIG. 2 is a block diagram of one embodiment of a network environment for handling transactions.

FIG. 2 is a block diagram of one embodiment of a network environment for handling payment transactions. Referring to FIG. 1, a payment processing remote computer system 201 is communicably coupled to a network 203 (e.g., the Internet, etc.) and maintains a storage 202 that contains virtual account numbers and reference codes for payment transactions. A merchant remote computer system 204 is also communicably coupled to network 203 and includes a transaction payment instruction generator 204A that generates instructions for a payment transaction and sends them to a customer remote computer system 205 via network 203.

In one embodiment, the instructions are bank transfer instructions to direct or otherwise notify customer remote computer system 205 that a bank transfer is needed to settle the payment amount, or at least a portion thereof, of a payment transaction. In one embodiment the bank transfer instructions include a virtual account number of the customer and a reference code associated with the payment transaction. Payment processing remote computer system 201 stores the virtual account number of the customer, the reference code, and other information and associates them with the payment transaction.

Customer remote computer system 205 receives the bank transfer instructions from merchant remote computer system 204 and generates a bank transfer request using bank transfer creation module 205A. In one embodiment, the bank transfer request generated by customer remote computer system 205 includes the virtual account number and the reference code associated with the payment transaction. Customer remote computer system 205 sends the bank transfer request via a network communication to customer bank (or other financial institution) 206. In response to the bank transfer request, customer bank 206 sends funds to payment processing system 201.

Upon receiving the funds, payment processing system 201 places the funds in the customer balance associated with the virtual account number of the customer and reconciles the funds with the payment transaction using the reference code. Thereafter, payment processing system 201 allocates the funds to the merchant associated with merchant remote computer system 204.

Note that the remote computers in FIG. 2 may be personal computers, servers, routers, network PCs, peer devices, other common network nodes, or the like, and may include some or all of the elements described above. The devices can be personal digital assistants or other like devices.

Exemplary computer networks 203 may include, without limitation, local area networks (LANs) and/or wide area networks (WANs). Such networking environments are commonplace in offices, enterprise-wide computer networks, intranets, and the Internet. When utilized in a WAN networking environment, a remote computer may include a modem or other means for establishing communications over the WAN, such as the Internet. In a networked environment, program modules or portions thereof may be stored in association with any of the remote computers. For example, and not by way of limitation, various application programs may reside on the memory associated with any one or more of the remote computers. It will be appreciated by those of ordinary skill in the art that the network connections shown are exemplary and other means of establishing a communications link between the computers (e.g., remote computers) may be utilized.

Although many other internal components of the remote computers are not shown, those of ordinary skill in the art will appreciate that such components and their interconnection are well known. Accordingly, additional details concerning the internal construction of the remote computers are not further disclosed herein except with the details provided below.

An Example of Payment Transaction Processing with Credit Transfers

In one embodiment, payment transactions may be performed using a process in which the payment of funds for a payment transaction is handled using a push-based credit transfer. In one embodiment, the process for handling a payment transaction includes a number of operations: 1) creating customer, creating and confirming a payment intent object, instructing a customer to complete a bank transfer, and confirming the payment intent object succeeded. Each of these will be discussed in more detail below.

Creating a Customer in the Payment Processing System

In one embodiment, the first operation that is performed to enable credit transfers to be used in payment processing of payment transactions is the creation of a customer. In one embodiment, the credit transfers are performed using bank transfers. In one embodiment, the creation of a customer occurs on a server. In one embodiment, the server is part of the payment processing system. Setting up the customer enables a customer balance to be set up for the customer in the payment processing system so that incoming funds from bank transfers may be stored.

In one embodiment, because bank transfers are held in a customer balance of the customer, the payment processing system associates a customer object with each bank transfer payment. In one embodiment, if a customer object already exists, then it may be used; otherwise, a new customer object is created and a customer balance is then associated with the customer object.

```
curl https://api.stripe.com/v1/customers \
-d description="test customer"
```

Creating and Confirming a Payment Intent Object

A PaymentIntent is an object that represents a merchant's intent to collect payment from a customer for a payment transaction. In one embodiment, the PaymentIntent object tracks the lifecycle of the payment process for the payment transaction through each stage.

In one embodiment, a merchant creates a PaymentIntent object on a server and its status is updated on the server. In one embodiment, the PaymentIntent object specifies the amount and a currency that the merchant wants to collect from a customer balance for the payment transaction.

In one embodiment, the PaymentIntent object also specifies a list of payment methods. In the case the payment may be made using a push-based credit transfer, the customer's customer balance is added to the list of payment method types for the PaymentIntent object.

```
curl https://api.stripe.com/v1/payment_intents \
-d amount=1000 \
-d currency=usd \
-d payment_method_types[ ]=customer_balance \
-d payment_method_data[type]=customer_balance \
-d payment_method_options[customer_balance][funding][type]=bank_
transfer \
-d customer={{customer ID}} \
-d confirm=true
```

In one embodiment, the payment processing system does not control the frequency, timing, or amount of transfers made by a customer and uses a single customer balance to receive funds from incoming bank transfers of the customer. This allows a merchant to flexibly collect payments from the customer balance at any time and worry less about the mechanics of how and when the transfers were made.

In one embodiment, if the customer already has a customer balance that is high enough to cover the payment amount of the payment transaction, the payment processing system immediately succeeds the PaymentIntent object with a succeeded status. In one embodiment, a customer can accrue a balance in their customer balance that may be used to cover the payment amount, or a portion thereof, for a payment transaction. This may occur when the customer accidentally overpay for a payment transaction.

In one embodiment, if the customer does not have a customer balance that is high enough to cover the payment amount of the payment transaction, the PaymentIntent object may be used to signal that a bank transfer is needed to cover the payment amount. In one embodiment, a field in the PaymentIntent object specifies that a bank transfer is to be used. For example, in one embodiment, the funding type field of the PaymentIntent object, which specifies what to do when the customer does not have enough balance to cover the payment amount, is set to indicate the funding type should be a bank transfer. Also, when a bank transfer is needed, a reference code is included in the PaymentIntent object to reconcile the payment for the payment transaction with the incoming bank transfer. In one embodiment, the reference code is an alphanumeric string that the customer will receive as part of their funding instructions and is used to reconcile this payment with incoming bank transfers. In one embodiment, the reference code is a unique, random value and is created automatically. The reference code may be created by the merchant computer system, the payment processing computer system or another computer system. In one embodiment, the reference code is selectable by a merchant.

Instruct the Customer to Complete a Bank Transfer

If the customer balance is not high enough to cover the request amount, the PaymentIntent object show a requires action status. For example, see below.

```
{
    id: "pi_abcdefg",
    object: "payment_intent",
    . . .
    status: "requires_action",
    next_action: {
        type: "complete_bank transfer",
        complete_bank transfer: {
            type: "ach",
            ach: {
                routing_number: "1234567890",
```

-continued

```
                account_number: "42424242"
            },
            reference_code: "ATKZ",
            amount_funded: 0,
        }
    }
}
```

In one embodiment, the payment processing system sets the status of the PaymentIntent object to the requires action status and this signals the merchant that instructions need to be sent to the customer to perform a bank transfer with their bank or financial institution.

In response to the updated status of the PaymentIntent object, the merchant provides instructions (or an order) to the customer to perform a bank transfer to push funds necessary to cover the outstanding payment amount of the payment transaction. In one embodiment, when the merchant sends instructions to the customer to perform a bank transfer, fields in the PaymentIntent object are updated. For example, an amount_funded field in the PaymentIntent object indicates the amount of funding already covered by the customer balance, if any.

In one embodiment, the following information is included in the PaymentIntent object when it is sent to the customer:
1) payment_intent[next_action][complete_bank_transfer] [type]: the type of virtual bank account to which transfer are to be transfer funds. In one embodiment, an additional hash is included on the next_action field with a name matching this value. The information also included is specific to the bank account type. In one embodiment, the following types may be used:

| Bank transfer types | Type-specific data |
|---|---|
| ach | routing_number: The routing number of the account to transfer funds to<br>account_number: The account number to transfer funds to |

2) payment_intent[next_action][complete_bank_transfer] [reference_code]: a unique code to identify the bank transfer. The merchant computer system instructs the customer to include the reference code in the reference field of their bank transfer. If a reference code is included in payment_method_options, the value is the same as the one the merchant specified.

3) payment_intent[next_action][complete_bank_transfer] [amount_funded]: The amount that has already been funded from a pre-existing customer balance. The merchant computer system instructs the customer to transfer the amount of the Payment Intent minus this amount.

In response to the instructions, a customer creates a transfer with their bank using the information provided from the merchant, including the reference code and virtual account number of the customer. The PaymentIntent will retain a requires_action status until funds arrive in the bank account.

Confirm the PaymentIntent Object Succeeded

In one embodiment, after receiving the funds from the bank transfer, the payment processing system updates the status of the PaymentIntent object from requires_action to succeeded. Using the reference code received with the incoming fund transfer, the payment processing system associates the funds with the open payment of the payment transaction having the same reference code. Based on the association, the payment processing system allocates funds to the merchant.

In one embodiment, the following events are sent when the status of the PaymentIntent

| Event | Description | Expected integration |
|---|---|---|
| payment_intent.succeeded | The customer's payment succeeded. | Fulfill the goods or services that the customer purchased. |

Manual Payment Using the Customer Balance

In one embodiment, the available customer balance is automatically used to pay any PaymentIntents using the customer balance payment method described above. In one embodiment, if the merchant wants more control over which PaymentIntents are paid, the payment of customer balance PaymentIntents may be set to manual.

Partially Funded PaymentIntents

When a customer's balance is applied to a PaymentIntent but is not sufficient to fully pay it, the payment_intent [next_action][complete_bank_transfer][amount_funded] of the PaymentIntents object is updated and the following event is sent:

| Event | Description | Expected integration |
|---|---|---|
| payment_intent.funded | The amount funded has changed. | Contact the customer to instruct them to transfer the remaining amount needed. |

This may happen because the customer transferred too little (due to mistaken underpayment or because of fees charged by the customer's bank) or because a remaining customer balance was applied to the PaymentIntent.

Figure 3:
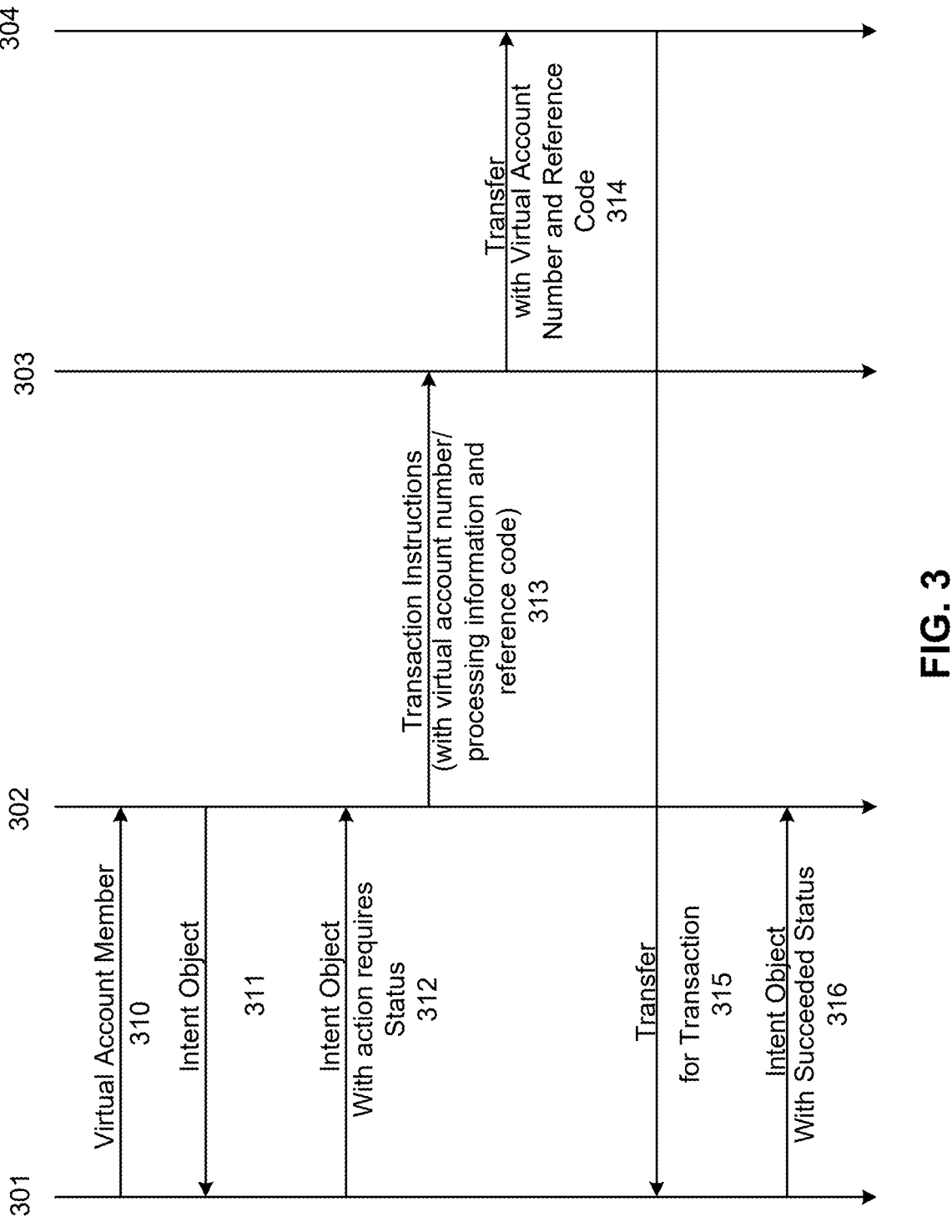
FIG. 3 is a timing diagram of a transaction processing flow according to one embodiment.

FIG. 3 is a timing diagram of a payment transaction processing flow according to one embodiment. Referring to FIG. 3, a payment processing system 301 sends a virtual account number (310) to merchant computer system 302, and merchant computer system 302 sends a payment intent object (311) for a payment transaction to payment processing system 301. The payment intent object specifies that the funding source for the payment transaction is the customer balance of a customer.

In response to the payment intent object, payment processing system 301 checks the customer balance of the customer and if the customer balance does not contain funds to cover the amount of the payment transaction, then payment processing system 301 sends the payment intent object (312) back to merchant computer system 302 with an undated status indicating that an action is required.

In response to receiving the payment intent object back with an undated status indicating that an action is required, merchant computer system 302 sends payment instructions (313) with a virtual account number of the customer and a reference code to customer computer system 303. In one embodiment, the payment instructions specify to the customer computer system 303 that a bank transfer is necessary to provide funds for the payment transaction.

In response to the payment instructions, customer computer system 303 requests a bank transfer (314) from bank (or other financial institution) 304. In one embodiment, the request includes the virtual account number of the customer and the reference code with instructions to include those in the money transfers.

In response to the bank transfer request, bank 304 transfers funds (315) for the payment transaction to payment processing computer system 301, which reconciles the funds using the virtual account number and the reference code. Thereafter, payment processing computer system 301 updates the payment intent object to a succeeded state and sends the updated object (316) to merchant computer system 302.

FIG. 4 is a block diagram of one embodiment of a computing system architecture for handling transactions with a payment processing system. In one embodiment, the computing system architecture is for a payment processing system. It will be appreciated that the computing system architecture shown in FIG. 4 is merely an example of one suitable computing system and is not intended as having any dependency or requirement related to any single module/ component or combination of modules/components.

Referring to FIG. 4, the computing system includes a customer creation component 401 for creating a customer in the payment processing system and an object creation component 402 to create objects in the payment processing system. In one embodiment, object creation component 402 creates a payment intent object. Note that in other embodiments the payment intent object is created by a merchant computer system or another computer system in the payment processing environment.

The computing system also includes an object tracking and status component 403 for tracking the status and state of objects, such as the payment intent object. In one embodiment, object tracking and status component 403 updates the state of the object from its initial creation through to when the object is succeeded.

The computing system further includes an incoming money transfer handling component 404 to handle incoming money transfers, a reconciliation component 405 to reconcile funds received via incoming money transfers with open payment transactions, and a funds allocation and transfers component 406 to allocate and transfer funds received from incoming money transfers to merchants based on the results of reconciliation produced by reconciliation component 405. In one embodiment, these components utilize a virtual account number and a reference code that accompany the incoming money transfer to perform the operations.

FIG. 5 is a flow diagram of one embodiment of a process for performing a payment transaction. The process is performed by processing logic that comprises hardware (circuitry, dedicated logic, etc.), software (e.g., software running on a chip, software run on a general-purpose computer system or a dedicated machine, etc.), firmware, or a combination of the three. In one embodiment, the operations in the process are performed by systems of a payment processing system, a merchant and a customer. While these systems are shown as one system, in one embodiment, they may be implemented with more than one system (e.g., a plurality of processing devices, servers, computer systems, etc.).

Referring to FIG. 5, the process begins by creating a customer to associate a customer object with a bank transfer payment (processing block 501).

After creating the customer, processing logic creates a payment intent object that represents a merchant's intent to collect payment from a customer (processing block 502). In one embodiment, the payment intent object is created by the merchant and sent, via a network (e.g., Internet) communication, to the payment processing system. In another embodiment, the payment processing system creates the payment intent object and sends it, via a network (e.g., Internet) communication, to the merchant.

In one embodiment, the payment intent object specifies the payment amount of the payment transaction and the currency the merchant desires to collect from a customer balance. In one embodiment, the payment intent object comprises funding instructions. In one embodiment, the funding instructions specify the operation(s) to take to ask for additional funds when the customer balance doesn't contain enough to cover the full amount of the payment transaction. In one embodiment, the payment intent object includes a list of one or more payment method types for the transaction and the customer balance is added to the list.

Using the payment intent object, processing logic tracks the lifecycle of the payment transaction through a multi-stage process (processing block 503). In one embodiment, each stage in the process is associated with a state. In one embodiment, the object has a number of states into which it may transition.

Processing logic determines whether the customer balance is enough to cover the payment amount (processing block 504), and if so, processing logic causes the payment intent object to succeed to the succeeded status and allocates funds from the customer balance to the payment amount associated with the object (processing block 505).

If processing logic determines that the customer balance is not enough to cover the payment amount, processing logic determines that the funding type for the payment intent object is a banking transfer, causes the payment intent object to transition to the requires action status (e.g., a status that indicates action is required), and sends, via a network (e.g., Internet) communication, this information to the merchant (processing block 506).

In response to receiving the information, the merchant instructions create a reference code and sends, via a network (e.g., Internet) communication, the customer instructions to complete a bank transfer with the reference code (processing block 507). In one embodiment, the reference is a unique code. In one embodiment, the reference code is randomly generated. In one embodiment, the instructions also specify the amount to be transferred by the customer. The amount to be transferred by the customer may be the amount of the payment transaction. In another embodiment, the amount to be transferred by the customer is the amount of the payment transaction less an amount that has already been funded by a pre-existing customer balance. In such a case, the instructions provided to the customer may indicate an amount that has already been funded by a pre-existing customer balance.

In response to receiving instructions from the merchant, processing logic of the customer creates a money transfer with their bank (or other financial institution) using the information provided by the merchant (processing block 508). Thereafter, in one embodiment, the bank transfer occurs at a time unknown to or otherwise indeterminant with respect to the payment processing system. In another embodiment, the payment processing system is notified of the time when the bank transfer will be incoming.

Processing logic of the payment processing system determines when funds arrive and changes status of the payment intent object to indicate that it has been completed (processing block 509). In one embodiment, the payment intent object is updated from a requires action status to a succeeded status. Thereafter, the funds from the incoming money transfer are allocated to an account of the merchant and a notification is sent, via a network (e.g., Internet) communication, to the merchant regarding the funds that have been placed in their account.

FIG. 6 is a flow diagram of another embodiment of a process for performing a payment transaction. The process is performed by processing logic that comprises hardware (e.g., circuitry, dedicated logic, etc.), software (e.g., software running on a chip, software run on a general-purpose computer system or a dedicated machine, etc.), firmware, or a combination of the three. In one embodiment, the operations in the process are performed by a payment processing system. While the payment processing system is shown as one system, in one embodiment, the payment processing system is implemented with more than one system (e.g., a plurality of processing devices, servers, computer systems, etc.).

Referring to FIG. 6, the process begins by processing logic programmatically creating a virtual account for a customer for a payment transaction between the customer and the merchant (processing block 601).

Processing logic also creates an object corresponding to the payment transaction, the object specifying a payment amount and being associated with a first reference code (processing block 602). In one embodiment, the object is created on a server. In one embodiment, the object specifies certain information for the payment transaction. In one embodiment, the object specifies the customer balance as a funding type for the payment transaction. In one embodiment, the object is created at the same time as the virtual account.

In one embodiment, processing logic receives, via a network (e.g., Internet, etc.) communication from the merchant, the object and the object indicates the payment from the customer balance in the virtual account and specifies a funding instruction to indicate one or more actions to take to obtain funding for the payment if funds in the customer balance are insufficient (processing block 603).

Note that in one embodiment, when the PaymentIntent (as indicated above) is confirmed, a check is made to determine if there is a virtual account for the customer, and if there isn't, then the payment processor sets one up at the same time the PaymentIntent is confirmed. In one embodiment, the payment processor (e.g., Stripe) sets up the virtual account automatically without explicit instructions from the merchant, and it acts as one input to the customer balance (e.g., any funds that arrive in the virtual account are reflected in the customer balance). In one embodiment, the PaymentIntent confirmation is an operation that finalizes the setup of the PaymentIntent and is indicated by the "confirm=true" parameter shown in the screenshot above.

After receiving the object, processing logic returns a status for the object to the merchant, via a network (e.g., Internet, etc.) communication that indicates to the merchant that the customer must take action to continue with the payment transaction (processing block 604). In one embodiment, returning the status of the object includes sending a notification, via a network (e.g., Internet) communication, to the merchant, to notify the merchant of status of the payment intent object that the customer has insufficient funds in the customer balance for the payment transaction and that a bank transfer is needed that specifies information identifying a financial institution for the money transfer and the first reference code for the money transfer.

Processing logic also tracks the state of the object as the object transitions between a plurality of states, including tracking the object in one of the states representing the time waiting for a money transfer from the customer for the payment transaction (processing block 605).

Subsequently, processing logic receives funds into a customer balance as part of an incoming money transfer for the customer that was set to occur at a time unknown to the payment processor (processing block 606).

In response to receipt of the funds, processing logic automatically associates the funds in the customer balance from the incoming money transfer with the object by matching a second reference code received with the incoming money transfer to the first reference code, if the incoming money transfer includes the second reference code (processing block 607) and allocates the funds to the payment amount of the object (processing block 608). In one embodiment, the second reference code is received by the customer, for use in the money transfer, as part of funding instructions provided by the merchant.

In one embodiment, if the incoming money transfer does not have the second reference code, processing logic performs predetermined payment reconciliation rules if the incoming money transfer does not include the second reference code (processing logic 609). In one embodiment, the predetermined payment reconciliation rules include a manual reconciliation option that enables the merchant to control whether funds associated with the incoming money transfer are applied to the payment transaction. In another embodiment, the predetermined payment reconciliation rules include automatic reconciliation rules that are performed.

An Example Computer System

Figure 7:
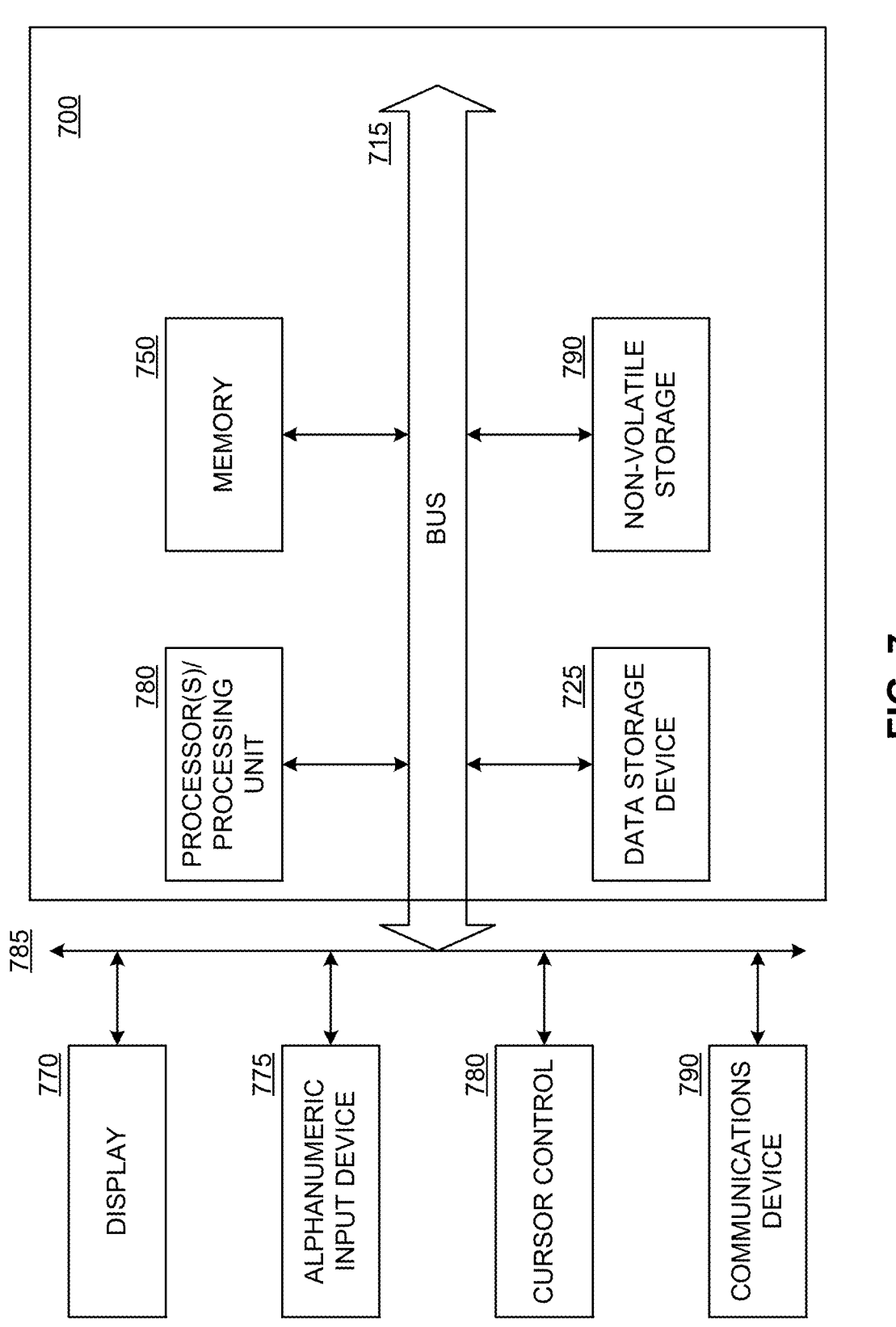
FIG. 7 is a block diagram of one embodiment of a computer system.

FIG. 7 is one embodiment of a computer system that may be used to support the systems and operations discussed herein. It will be apparent to those of ordinary skill in the art, however that other alternative systems of various system architectures may also be used.

The data processing system illustrated in FIG. 7 includes a bus or other internal communication means 715 for communicating information, and a processor(s) 710 coupled to the bus 715 for processing information. The system further comprises a random-access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor(s) 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

In one embodiment, processor(s) 710 executes operations related to the credit-based transfers discussed above.

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. For example, the handheld device may be configured to contain only the bus 785, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

There is a number of example embodiments described herein.

Example 1 is a method for handling a transaction involving a merchant, a customer and a payment processor, the method comprising: programmatically creating a virtual account for a customer for a payment transaction between the customer and the merchant; creating, on a server, an object corresponding to the payment transaction, the object specifying a payment amount and being associated with a first reference code; tracking state of the object as the object transitions between a plurality of states, the object being in one state while waiting for a money transfer from the customer for the payment transaction; receiving funds into a customer balance as part of an incoming money transfer for the customer that was set to occur at a time unknown to the payment processor; automatically associating funds in the customer balance from the incoming money transfer with the object by matching a second reference code received with the incoming money transfer to the first reference code; and allocating the funds to the payment amount of the object.

Example 2 is the method of example 1 that may optionally include receiving, via a first network communication from the merchant, the object, the object to indicate the payment from the customer balance in the virtual account and specifies a funding instruction to indicate one or more actions to take to obtain funding for the payment if funds in the customer balance are insufficient.

Example 3 is the method of example 2 that may optionally include returning a status for the object in response to receiving the object that indicates to the merchant that the customer must take action to continue with the payment transaction.

Example 4 is the method of example 2 that may optionally sending a notification, via a second network communication, to the merchant, to notify the merchant of status of the object that the customer has insufficient funds in the customer balance for the payment transaction and that a bank transfer is needed that specifies information identifying a financial institution for the money transfer and the first reference code for the money transfer.

Example 5 is the method of example 1 that may optionally include that the object specifies the customer balance as a funding type.

Example 6 is the method of example 1 that may optionally include that the second reference code is received by the customer, for use in the money transfer, as part of funding instructions provided by the merchant.

Example 7 is the method of example 1 that may optionally include performing predetermined payment reconciliation rules if the incoming money transfer does not include the second reference code.

Example 8 is the method of example 7 that may optionally include that the predetermined payment reconciliation rules include a manual reconciliation option that enables the merchant to control whether funds associated with the incoming money transfer are applied to the payment transaction.

Example 9 is the method of example 1 that may optionally include that automatically allocating the funds to the payment amount of the object upon receipt of the funds.

Example 10 is a payment processing system to process a transaction involving a merchant, a customer and a payment processor, where the system comprises: a network interface; a memory to store instructions; one or more processors coupled to the memory and the network interface to execute the stored instructions to: programmatically create a virtual account for a customer for a payment transaction between the customer and the merchant; create, on a server, an object corresponding to the payment transaction, the object specifying a payment amount and being associated with a first reference code; track state of the object as the object transitions between a plurality of states, the object being in one state while waiting for a money transfer from the customer for the payment transaction; receive funds into a customer balance as part of an incoming money transfer for the customer that was set to occur at a time unknown to the payment processing system; automatically associate funds in the customer balance from the incoming money transfer with the object by matching a second reference code received with the incoming money transfer to the first reference code; and allocate the funds to the payment amount of the object.

Example 11 is the system of example 10 that may optionally include that the one or more processors are configured to: obtain, via a first network communication received from the merchant via the network interface, the object, the object to indicate the payment from the customer balance in the virtual account and specifies a funding instruction to indicate one or more actions to take to obtain funding for the payment if funds in the customer balance are insufficient; and return a status to the merchant, via a second network communication through the network interface, indicating the merchant that the customer must take action to continue with the payment transaction.

Example 12 is the system of example 10 that may optionally include that the one or more processors are configured to: obtain, via a first network communication received from the merchant via the network interface, the object, the object to indicate the payment from the customer balance in the virtual account and specifies a funding instruction to indicate one or more actions to take to obtain funding for the payment if funds in the customer balance are insufficient; and send a notification, via a second network communication, to the merchant, to notify the merchant of status of the object that the customer has insufficient funds in the customer balance for the payment transaction and that a bank transfer is needed that specifies information identifying a financial institution for the money transfer and the first reference code for the money transfer.

Example 13 is the system of example 10 that may optionally include that the object specifies the customer balance as a funding type.

Example 14 is the system of example 10 that may optionally include that the second reference code is received by the customer, for use in the money transfer, as part of funding instructions provided by the merchant.

Example 15 is the system of example 10 that may optionally include that the one or more processors are configured to perform predetermined payment reconciliation rules if the incoming money transfer does not include the second reference code.

Example 16 is the system of example 10 that may optionally include that the predetermined payment reconciliation rules include a manual reconciliation option that enables the merchant to control whether funds associated with the incoming money transfer are applied to the payment transaction.

Example 17 is one or more non-transitory computer readable storage media having instructions stored thereupon which, when executed by a payment processing system having at least a processor and a memory therein, cause the payment processing system to perform operations comprising: programmatically creating a virtual account for a customer for a payment transaction between the customer and the merchant; creating, on a server, an object corresponding to the payment transaction, the object specifying a payment amount and being associated with a first reference code; tracking state of the object as the object transitions between a plurality of states, the object being in one state while waiting for a money transfer from the customer for the payment transaction; receiving funds into a customer balance as part of an incoming money transfer for the customer that was set to occur at a time unknown to the payment processing system; automatically associating funds in the customer balance from the incoming money transfer with the object by matching a second reference code received with the incoming money transfer to the first reference code; and allocating the funds to the payment amount of the object.

Example 18 is the one or more non-transitory computer readable storage media of example 17 that may optionally include that the method further comprises: obtaining, via a first network communication received from the merchant via the network interface, the object, the object to indicate the payment from the customer balance in the virtual account and specifies a funding instruction to indicate one or more actions to take to obtain funding for the payment if funds in the customer balance are insufficient; and returning a status to the merchant, via a second network communication through the network interface, indicating the merchant that the customer must take action to continue with the payment transaction.

Example 19 is the one or more non-transitory computer readable storage media of example 17 that may optionally include that the method further comprises: obtaining, via a first network communication received from the merchant via the network interface, the object, the object to indicate the payment from the customer balance in the virtual account and specifies a funding instruction to indicate one or more actions to take to obtain funding for the payment if funds in the customer balance are insufficient; and sending a notification, via a second network communication, to the merchant, to notify the merchant of status of the object that the customer has insufficient funds in the customer balance for the payment transaction and that a bank transfer is needed that specifies information identifying a financial institution for the money transfer and the first reference code for the money transfer.

Example 20 is the one or more non-transitory computer readable storage media of example 17 that may optionally include that the object specifies the customer balance as a funding type.

Example 21 is the one or more non-transitory computer readable storage media of example 17 that may optionally include that the second reference code is received by the customer, for use in the money transfer, as part of funding instructions provided by the merchant.

Example 22 is the one or more non-transitory computer readable storage media of example 17 that may optionally include that the method further comprises automatically allocating the funds to the payment amount of the object upon receipt of the funds.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A processing system of a network, comprising:
memory; and
one or more processors, coupled to the memory, configured to cause the processing system to perform operations comprising:
serving, to a browser of an electronic device, a form that is enabled by an object-oriented programming language library;
receiving, from the browser of the electronic device and based on serving the form that is enabled by the object-oriented programming language library, information that is not sent from the browser of the electronic device to one or more servers associated with a website;
generating, based on receiving the information from the browser of the electronic device, a single-use token for the browser of the electronic device;
transmitting the single-use token to the browser of the electronic device;
receiving, based on transmitting the single-use token to the browser of the electronic device, a request that is submitted by the one or more servers using the single-use token and that includes a payment intent object that includes information regarding a transaction;
setting a status, of the payment intent object, to indicate that an action is required using the electronic device;
updating, to obtain an updated object, the status, of the payment intent object, to indicate that the action succeeded; and
transmitting the updated object to the one or more servers.

2. The processing system of claim 1,
wherein the operations further comprise:
sending, before receiving the request, a virtual account number to the one or more servers.

3. The processing system of claim 1, wherein the action includes the electronic device sending a request for a transfer to the processing system.

4. The processing system of claim 1,
wherein the payment intent object includes a reference code created by the one or more servers.

5. A method, comprising:
receiving, by a processing system, information from a browser of an electronic device;
generating, by the processing system and based on receiving the information from the browser of the electronic device, a single-use token for the browser of the electronic device;
transmitting, by the processing system, the single-use token to the browser of the electronic device;
receiving, by the processing system, from one or more servers, and based on transmitting the single-use token to the browser of the electronic device, a payment intent object that includes information regarding a transaction associated with the electronic device and a client-side application associated with the one or more servers;
sending, by the processing system and to the one or more servers, the payment intent object with a status indicating that an action is required;
receiving, by the processing system and from the one or more servers, an indication that indicates a successful interaction, for the action, between the one or more servers and the electronic device;
updating, to obtain an updated object and based on receiving the indication from the one or more servers, the status, of the payment intent object, to indicate that the action succeeded; and
transmitting the updated object to the one or more servers.

6. The method of claim 5, further comprising:
sending a virtual account number to the one or more servers before receiving the payment intent object from the one or more servers.

7. The method of claim 5, wherein the status is undated.

8. The method of claim 5, wherein the action includes the electronic device sending a request for a transfer to the processing system.

9. The method of claim 5, wherein the action is a transfer to provide for the transaction.

10. The method of claim 5, wherein sending the payment intent object with the status comprises:
sending, to the one or more servers, a notification that a transfer is needed that specifies information identifying an instruction for the transfer and a first reference code for the transfer.

11. The method of claim 10, further comprising:
receiving the transfer; and
associating the transfer with the payment intent object by matching a second reference code received with the transfer to the first reference code.

12. The method of claim 5, further comprising:
transmitting, by the processing system and to the electronic device, a form, for the information, after the client-side application is used to set up the transaction.

13. The method of claim 5, wherein receiving the payment intent object comprises:

receiving, from the one or more servers and based on transmitting the single-use token to the browser of the electronic device, a request that includes the payment intent object.

14. The method of claim 5, wherein the payment intent object includes a reference code, and wherein the instructions include an instruction to include, in a transfer to the processing system, the reference code.

15. The method of claim 14, wherein the instructions further include, in the transfer to the processing system, a virtual account number associated with the electronic device.

16. The method of claim 5, further comprising:

receiving, before updating the status, a transfer sent to a virtual account number created by the processing system and sent to the electronic device for the transfer.

17. The method of claim 5, wherein the payment intent object specifies a list of methods for satisfying the transaction.

18. One or more non-transitory computer-readable medium storing instructions that, when executed by one or more processors of a processing system, cause the processing system to perform operations comprising:

receiving information from a browser of an electronic device;

generating, based on receiving the information from the browser of the electronic device, a single-use token for the browser of the electronic device;

transmitting the single-use token to the browser of the electronic device;

receiving, from one or more servers and based on transmitting the single-use token to the browser of the electronic device, a payment intent object that includes information regarding a transaction associated with an electronic device and a client-side application associated with the one or more servers;

setting a status, of the payment intent object, to indicate that an action is required for the transaction;

sending, after setting the status, the payment intent object to the one or more servers;

updating, to obtain an updated object, the status, of the payment intent object, to indicate that the action succeeded; and transmitting the updated object to the one or more servers.

19. The one or more non-transitory computer-readable medium of claim 18, wherein the operations further comprise:

sending a virtual account number to the one or more servers before receiving the payment intent object from the one or more servers.

20. The one or more non-transitory computer-readable medium of claim 18, wherein updating the status of the payment intent object comprises:

receiving a transfer, associating the transfer with the payment intent object, and updating the status of the payment intent object based on associating the transfer with the payment intent object.

* * * * *